United States Patent
Cleeves (10) Patent No.: US 9,316,150 B2
(45) Date of Patent: Apr. 19, 2016

(54) VARIABLE COMPRESSION RATIO DIESEL ENGINE

(71) Applicant: James M. Cleeves, Redwood City, CA (US)

(72) Inventor: James M. Cleeves, Redwood City, CA (US)

(73) Assignee: Pinnacle Engines, Inc., San Carlos, CA (US)

( * ) Notice: Subject to any disclaimer, the term of this patent is extended or adjusted under 35 U.S.C. 154(b) by 60 days.

(21) Appl. No.: 13/934,153

(22) Filed: Jul. 2, 2013

(65) Prior Publication Data

US 2014/0000567 A1    Jan. 2, 2014

Related U.S. Application Data

(60) Provisional application No. 61/667,369, filed on Jul. 2, 2012.

(51) Int. Cl.
| | |
|---|---|
| *F02D 15/04* | (2006.01) |
| *F02B 75/28* | (2006.01) |

(Continued)

(52) U.S. Cl.
CPC .............. *F02B 75/04* (2013.01); *F02B 75/28* (2013.01); *F02D 15/02* (2013.01); *F02D 35/026* (2013.01);

(Continued)

(58) Field of Classification Search
CPC ......... F02D 15/04; F02D 15/02; F02B 75/04; F02B 75/041; F02B 75/047; F02B 75/28; F02B 2075/027; F01B 7/14
USPC .......... 123/48 R, 55.2, 55.5, 55.7, 53.3, 48 C, 123/51 R, 51 BA
See application file for complete search history.

(56) References Cited

U.S. PATENT DOCUMENTS

| | | |
|---|---|---|
| 367,496 A | 8/1887 | Atkinson |
| 1,082,004 A | 12/1913 | Anthony |

(Continued)

FOREIGN PATENT DOCUMENTS

| | | |
|---|---|---|
| CN | 101427012 A | 5/2009 |
| DE | 643470 C | 4/1937 |

(Continued)

OTHER PUBLICATIONS

PCT Search Report and Written Opinion dated Jan. 23, 2014 for PCT application No. PCT/US2013/049160.

(Continued)

*Primary Examiner* — Lindsay Low
*Assistant Examiner* — Syed O Hasan
(74) *Attorney, Agent, or Firm* — Mintz Levin Cohn Ferris Glovsky and Popeo, P.C.

(57) ABSTRACT

Diesel opposed piston engines, optionally with variable compression ratio and/or turbocharging, can provide improved fuel efficiency by adapting a compression ratio of the engine in accordance with an engine load such that larger compression ratios are used for smaller loads and smaller compression ratios are used for larger loads. Turbocharging can provide improved efficiency at the smaller compression ratio operating conditions. Optionally, one or more current engine parameters can be modified to maintain a peak combustion chamber temperature below a threshold temperature at which an acceptable level of nitrogen oxide pollutants ($NO_x$) is expected to be formed. One or more swirl inducing features can be included on piston crowns in an opposed piston engine. Methods, systems, articles of manufacture, etc. are described.

20 Claims, 6 Drawing Sheets

(51) Int. Cl.
*F02B 75/04* (2006.01)
*F02D 15/02* (2006.01)
*F02D 35/02* (2006.01)
*F01B 7/14* (2006.01)
*F02D 41/40* (2006.01)

(52) U.S. Cl.
CPC ............... *F02D 41/402* (2013.01); *F01B 7/14* (2013.01); *F02B 75/047* (2013.01); *F02D 41/40* (2013.01); *Y02T 10/12* (2013.01); *Y02T 10/44* (2013.01)

(56) References Cited

U.S. PATENT DOCUMENTS

| | | | |
|---|---|---|---|
| 1,097,947 A | 5/1914 | Shaw | |
| 1,140,987 A | 5/1915 | Kube | |
| 1,258,524 A | 3/1918 | Berry | |
| 1,316,977 A | 9/1919 | Ricardo | |
| 1,377,798 A | 5/1921 | Berckenhoff | |
| 1,453,304 A | 5/1923 | Charter | |
| 1,459,819 A | 6/1923 | Bonner | |
| 1,472,549 A | 10/1923 | Burtnett | |
| 1,497,206 A | 6/1924 | Booton | |
| 1,502,291 A | 7/1924 | Conway | |
| 1,550,643 A | 8/1925 | Bullingtgon | |
| 1,634,768 A | 7/1927 | Bonner | |
| 1,644,954 A | 10/1927 | Shearer | |
| 1,673,340 A | 6/1928 | Schaeffer | |
| 1,773,971 A | 8/1930 | Dunn | |
| 1,812,323 A | 6/1931 | Davison et al. | |
| 1,819,897 A | 8/1931 | Johnson | |
| 1,823,770 A | 9/1931 | Tartrais | |
| 1,837,870 A | 12/1931 | Johnston | |
| 1,856,242 A | 5/1932 | D'Aix | |
| 1,889,946 A | 12/1932 | Cadwell | |
| 2,090,889 A | 8/1937 | Howald | |
| 2,121,409 A | 6/1938 | Ricardo | |
| 2,199,625 A | 5/1940 | Benno | |
| 2,273,179 A | 2/1942 | Davison | |
| 2,292,233 A | 8/1942 | Lysholm | |
| 2,401,188 A | 5/1946 | Prince | |
| 2,409,761 A | 10/1946 | Hulsing | |
| 2,686,507 A | 8/1954 | Lombardi | |
| 2,773,490 A | 12/1956 | Miller | |
| 2,817,322 A | 12/1957 | Miller | |
| 2,858,816 A | 11/1958 | Prentice | |
| 2,937,631 A | 5/1960 | Coyle | |
| 3,485,221 A | 12/1969 | Feedback | |
| 3,533,429 A | 10/1970 | Shoulders | |
| 3,780,719 A | 12/1973 | Weiertz | |
| 3,948,241 A | 4/1976 | Melchior | |
| 3,961,607 A | 6/1976 | Brems | |
| 4,050,421 A | 9/1977 | Cendak | |
| 4,057,040 A | 11/1977 | Wax | |
| 4,104,995 A | 8/1978 | Steinbock | |
| 4,516,537 A | 5/1985 | Nakahara et al. | |
| 4,535,735 A | 8/1985 | Yoshinaga et al. | |
| 4,815,421 A | 3/1989 | Paul et al. | |
| 4,838,214 A | 6/1989 | Barrett | |
| 4,856,463 A | 8/1989 | Johnston | |
| 4,876,992 A | 10/1989 | Sobotowski | |
| 4,928,658 A | 5/1990 | Ferrenberg et al. | |
| 5,025,757 A | 6/1991 | Larsen | |
| 5,054,438 A | 10/1991 | Takashima | |
| 5,058,536 A * | 10/1991 | Johnston | 123/51 BA |
| 5,113,805 A | 5/1992 | Kawamura | |
| 5,127,375 A | 7/1992 | Bowman et al. | |
| 5,188,067 A | 2/1993 | Fontichiaro et al. | |
| 5,255,637 A | 10/1993 | Schechter | |
| 5,445,117 A | 8/1995 | Mendler | |
| 5,507,253 A | 4/1996 | Lowi, Jr. | |
| 5,560,326 A | 10/1996 | Merritt | |
| 5,623,894 A | 4/1997 | Clarke | |
| 5,803,042 A | 9/1998 | Bortone | |
| 6,039,011 A | 3/2000 | Agalarov et al. | |
| 6,125,801 A | 10/2000 | Mendler | |
| 6,205,963 B1 | 3/2001 | Davies | |
| 6,230,671 B1 * | 5/2001 | Achterberg | 123/48 R |
| 6,230,683 B1 | 5/2001 | zur Loye et al. | |
| 6,390,041 B2 | 5/2002 | Nakamura et al. | |
| 6,474,281 B1 | 11/2002 | Walters | |
| 6,502,543 B1 | 1/2003 | Arai et al. | |
| 6,994,060 B2 | 2/2006 | Yoeda | |
| 7,004,119 B2 | 2/2006 | Dardalis | |
| 7,559,298 B2 | 7/2009 | Cleeves | |
| 7,584,724 B2 | 9/2009 | Berger | |
| 7,921,817 B2 | 4/2011 | Cleeves | |
| 8,210,147 B2 | 7/2012 | Cotton | |
| 8,365,697 B2 | 2/2013 | Cleeves | |
| 8,413,619 B2 * | 4/2013 | Cleeves | 123/78 F |
| 8,459,227 B2 | 6/2013 | Cotton | |
| 8,573,178 B2 | 11/2013 | Cleeves | |
| 8,651,086 B2 | 2/2014 | Cleeves | |
| 8,789,499 B2 * | 7/2014 | Alonso | 123/51 R |
| 8,904,998 B2 | 12/2014 | Cleeves | |
| 2004/0244758 A1 | 12/2004 | Weng et al. | |
| 2008/0115771 A1 | 5/2008 | Elsbett | |
| 2008/0127947 A1 * | 6/2008 | Hofbauer et al. | 123/51 R |
| 2009/0107139 A1 | 4/2009 | Berger | |
| 2010/0147269 A1 | 6/2010 | Flowers et al. | |
| 2012/0073526 A1 * | 3/2012 | Dion et al. | 123/41.44 |
| 2012/0085302 A1 | 4/2012 | Cleeves | |
| 2012/0089316 A1 | 4/2012 | Cleeves et al. | |
| 2012/0158273 A1 * | 6/2012 | Cleeves et al. | 701/105 |
| 2013/0014718 A1 * | 1/2013 | Shen et al. | 123/18 A |
| 2013/0220279 A1 | 8/2013 | Cleeves | |
| 2014/0311431 A1 | 10/2014 | Cleeves | |

FOREIGN PATENT DOCUMENTS

| | | |
|---|---|---|
| DE | 19813398 C1 | 9/1999 |
| DE | 10023442 A1 | 11/2001 |
| EP | 1857801 A1 | 11/2007 |
| FR | 348575 A | 4/1905 |
| FR | 497282 A | 12/1919 |
| FR | 805866 A | 12/1936 |
| FR | 2900683 A1 | 11/2007 |
| GB | 02015 | 0/1909 |
| GB | 382670 A | 10/1932 |
| GB | 542009 A | 12/1941 |
| GB | 635664 A | 4/1950 |
| GB | 746820 A | 3/1956 |
| GB | 1466311 A | 3/1977 |
| GB | 1516982 A | 7/1978 |
| GB | 2431695 A | 5/2007 |
| GB | 2432398 A | 5/2007 |
| JP | 56-106040 A | 8/1981 |
| JP | 62-007909 | 1/1987 |
| JP | S63-154821 | 6/1988 |
| JP | 01-313608 | 12/1989 |
| JP | 09-280370 | 10/1997 |
| JP | 10-038083 | 2/1998 |
| JP | 10-311231 A | 11/1998 |
| JP | 2001-073780 A | 3/2001 |
| JP | 2004-239182 A | 8/2004 |
| JP | 2005-113839 A | 4/2005 |
| JP | 2008-505282 A | 2/2008 |
| WO | WO-79/00650 A1 | 9/1979 |
| WO | WO-2006002982 A1 | 1/2006 |
| WO | WO-2007/006469 A2 | 1/2007 |
| WO | WO-2007010186 A1 | 1/2007 |
| WO | WO-2007057660 A1 | 5/2007 |
| WO | WO-2007083159 A1 | 7/2007 |
| WO | WO-2007/121086 A2 | 10/2007 |

OTHER PUBLICATIONS

Extended European Search Report issued in European Application No. 11831731, mailed Oct. 9, 2014.

International Search Report dated Feb. 6, 2012, for PCT application No. PCT/US2011/055457.

(56) References Cited

OTHER PUBLICATIONS

International Search Report dated Mar. 19, 2012 for PCT application No. PCT/US2011/055486.

Heywood, John B., Internal Combustion Engine Fundamentals, Chapter 1—Engine Types and their Operation, Apr. 1988, p. 37, McGraw-Hill, Inc.

Heywood, John B., Internal Combustion Engine Fundamentals, Chapter 5—Ideal Models of Engine Cycles, Apr. 1988, pp. 170, 175, 184, and 185, McGraw-Hill, Inc.

Heywood, John B., Internal Combustion Engine Fundamentals, Chapter 9—Combustion in Spark-Ignition Engines, Apr. 1988, p. 393, McGraw-Hill, Inc.

Heywood, John B., Internal Combustion Engine Fundamentals, Chapter 12—Engine Heat Transfer, Apr. 1988, pp. A and B, McGraw-Hill, Inc.

Heywood, John. B., "Internal Combustion Engine Fundamentals", Ch. 13, Engine Friction and Lubrication, Apr. 1988, p. C, McGraw-Hill, Inc.

Law, Don et al., Controlled Combustion in an IC-Engine with Fully Variable Valve Train, Homogeneous Charge Compression Ignition (HCCI) Combustion—SP 1623, Mar. 2001, pp. 17-18, Society of Automotive Engineers, Inc., Warrendale, PA, USA.

Oakley, Aaron et al., Experimental Studies on Controlled Auto-Ignition (CAI) Combustion of Gasoline in a 4-stroke Engine, Homogeneous Charge Compression Ignition (HCCI) Combustion—SP 1623, Mar. 2001, pp. 105-109, Society of Automotive Engineers, Inc. Warrendale, PA, USA.

Rennie, Gabriele, Engine Shows Diesel Efficiency without the Emissions, Homogeneous Charge Compression Ignition Engine—Lawrence Livermore National Laboratory, S&TR Apr. 2004, pp. 17-19.

* cited by examiner

VARIABLE COMPRESSION RATIO DIESEL ENGINE

RELATED APPLICATION

This application claims priority under 35 U.S.C. §119(e) to U.S. provisional application No. 61/667,369 filed on Jul. 2, 2012 and entitled "Variable Compression Ratio Diesel Engine." The priority application is incorporated by reference in its entirety as is each other document referenced in this application.

TECHNICAL FIELD

The subject matter described herein relates to diesel engines with a variable compression ratio capability.

BACKGROUND

Diesel engines have rather recently begun to gain greater acceptance for use in light duty and passenger transportation applications. In particular, turbocharged diesels have been widely used in Europe for many years. Due to the increased availability of low-sulfur diesel fuel in North America in recent years, such engines are also becoming increasingly available in the United States and Canadian markets as well.

In general, a turbocharged engine (either diesel, other compression ignited, or spark ignited) can produce higher power outputs, lower emissions levels, and improved efficiency than a similarly sized (e.g. in terms of volumetric displacement), naturally aspirated engine. The power and efficiency improvements generally result from forcing of more air, and proportionately more fuel, into the combustion chamber or chambers of an engine than atmospheric pressure alone can achieve. The amount by which the intake manifold pressure of a turbocharged engine exceeds atmospheric pressure is generally referred to as a level of boost and is representative of the extra air pressure in the intake manifold of the engine relative to the pressure achievable without the use of forced induction.

The maximum pressure within a combustion chamber of an internal combustion engine generally limits the power density achievable by the engine. As used herein, the term "combustion chamber" generally refers to a volume existing within a cylinder of such an engine when it is at its minimum volume and being bounded by one or more of the walls of the cylinder, valve surfaces, piston crowns, and the like.

A compression ratio of an internal combustion engine represents the ratio of the volume at its largest capacity relative to its smallest capacity. The effective expansion ratio is the ratio of the cylinder volume at the completion of combustion to the opening of the exhaust valve. The effective compression ratio is the ratio of the volume of the cylinder when the intake valve closes to the minimum volume. In an opposed piston engine, the compression ratio is generally calculated as the cylinder volume when the piston crowns are furthest apart divided by the combustion chamber volume when the piston crowns are closest together. Some engines have effective compression and expansion ratios that differ from one another. As used herein, the effective compression ratio is the quotient of the cylinder volume at the beginning of the compression stroke divided by the combustion chamber volume at the end of the compression stroke, and the geometric expansion ratio is the quotient of the cylinder volume at the end of the expansion stroke divided by the combustion chamber volume at the beginning of the expansion stroke. The effective compression ratio and effective expansion ratio of an engine need not be equal. For example, if the inlet valve closes late so that the piston is already on its way up, the effective compression ratio is less than the geometric compression ratio. If combustion takes place well after top dead center, the effective expansion ratio is less than the geometric expansion ratio. Also, depending on the timing of the closing and the opening of the intake and exhaust valves, respectively, the combustion chamber volume at the beginning of the compression stroke and the combustion chamber volume at the end of the expansion stroke need not be the cylinder volume at a piston bottom dead center position.

For a diesel engine to run reliably, the compression ratio within the combustion chamber is generally maintained above a threshold necessary to create sufficiently high temperatures in the combustion chamber to cause auto-ignition of diesel fuel delivered within the combustion chamber and mixed with compressed gases to form a combustion mixture. A combustion mixture as used herein refers to gases and optionally aerosol droplets (e.g. of fuel delivered by an injector) within the combustion chamber. The gases can include air, vaporized fuel, and possibly other gases (e.g. recirculated exhaust gases, other diluents, etc.).

SUMMARY

It will be understood from the descriptions herein that an opposed piston engine configuration can provide beneficial results in a diesel engine configured for use in light duty vehicle applications. Such an engine can optionally include a turbocharger and intercooler as discussed in relation to various implementations herein. In various implementations of the current subject matter, such an engine can be a four-stroke engine in which intake, compression, power (e.g. expansion) and exhaust occur over two revolutions of the engine's crankshaft such that each process can be independently controlled. The use of variable compression ratios in such engines can be applied using one or more techniques (including but not limited to phasing of piston timing in an opposed piston engine, changing of a distance between crankshafts in such an engine, etc.). In a spark-ignited engine, compression ratios can be limited by the need to avoid auto-ignition or other combustion events that are not controlled by the engine's ignition system. In a diesel engine consistent with the current descriptions, a high compression ratio can be beneficially applied to increase efficiency for part of a driving cycle where relatively lower torque is required. When a higher amount of torque is necessary to provide for an elevated engine load, the compression ratio can be reduced as discussed above. In conjunction with such an approach, or alternatively as a standalone approach, information about one or more aspects of engine operation can be used to predict a combustion chamber temperature, and one or more engine operation parameters can be adjusted to maintain a peak temperature in the combustion chamber below a threshold temperature to limit nitrogen oxide generation. Additionally, piston crown configurations that promote swirl and quick mixing of fuel injected into the combustion chamber can be used in opposed piston engines, both for diesel applications and for spark-ignited configurations.

In one aspect of the current subject matter, a method includes operating a diesel opposed piston engine with a first compression ratio to supply engine power in response to a first engine load. The diesel opposed piston engine includes a combustion chamber defined at least in part by crowns of two pistons coupled to two crankshafts. The method further includes changing the first compression ratio to a second compression ratio to supply engine power in response to a second engine load. The second engine load is larger than the first engine load, and the second compression ratio is smaller than the first compression ratio.

In a second interrelated aspect, a diesel opposed piston engine includes a combustion chamber defined at least in part by crowns of two pistons coupled to two crankshafts and an engine controller. The engine controller performs operations that include operating the diesel opposed piston engine with a first compression ratio to supply engine power in response to a first engine load and changing the first compression ratio to a second compression ratio to supply engine power in response to a second engine load. The second engine load is larger than the first engine load, and the second compression ratio is smaller than the first compression ratio.

In another interrelated aspect, a method includes determining a predicted peak combustion chamber temperature that will occur in a combustion chamber of a diesel internal combustion engine. The determining is based on engine operation information. The method further includes identifying a target set of engine operation parameters when the predicted peak combustion chamber temperature exceeds a threshold temperature at which an acceptable level of nitrogen oxide pollutants (NOX) is expected to be formed in the combustion chamber; and applying the target set of engine operation parameters to modify one or more current engine parameters to thereby maintain the peak combustion chamber temperature below the threshold temperature.

In another interrelated aspect, a diesel opposed piston engine includes a combustion chamber defined at least in part by crowns of two pistons coupled to two crankshafts and an engine controller. The engine controller performs operations including determining a predicted peak combustion chamber temperature that will occur in the combustion chamber based on engine operation information, identifying a target set of engine operation parameters when the predicted peak combustion chamber temperature exceeds a threshold temperature at which an acceptable level of nitrogen oxide pollutants (NOX) is expected to be formed in the combustion chamber, and applying the target set of engine operation parameters to modify one or more current engine parameters to thereby maintain the peak combustion chamber temperature below the threshold temperature.

In some variations, one or more additional features can optionally be included in any feasible combination. The changing of the compression ratio can be performed using at least one of a phasing change of the phase of the two pistons and a translation of a distance between the two crankshafts. Inlet air can be supplied to the combustion chamber via a turbocharger that increases a pressure of the supplied air to higher than ambient pressure. The turbocharger can supply inlet air with a second pressure while the second compression ratio is used and a first pressure while the first compression ratio is used. The second pressure can be larger than the first pressure. The crowns of the two pistons can include one or more swirl canceling features. The one or more swirl canceling features can cause inlet air to the combustion chamber to have a high swirl and to split into at least two co-rotating swirls formed in front of respective injectors that deliver fuel to the combustion chamber.

The engine operation information can include an intercooler outlet temperature measured at or near an outlet of an intercooler that receives and cools air compressed by a turbocharger, and a compression ratio within the engine. The target set of engine parameters can include fuel delivery parameters. The fuel delivery parameters can include one or more of an amount of fuel injected into the combustion chamber for a given engine cycle, a timing of one or more injections of fuel during a cycle of the engine, and a number of injections of fuel occurring during the cycle of the engine. The target set of engine parameters can include a change of a current compression ratio to a smaller compression ratio to reduce an energy density within the combustion chamber and thereby reduce the peak temperature.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In modern, small diesel engines, such as those configured for use in passenger vehicles, light duty trucks, etc., a compression ratio sufficient to enable auto-ignition of the injected fuel can typically be at least approximately 16:1. Once the engine has achieved its operating temperature, compression ratios of this magnitude can be favorable for high efficiency (e.g. for one or more of the reasons discussed above). However, high compression ratios in a diesel engine can be less favorable for high power density, for example because burning of a larger mass of fuel under a high compression ratio can generate substantial heat and pressure, which can have undesirable consequences.

Heavy-duty (e.g. large engine load) applications can require a very robust engine structure to withstand the pressures needed to achieve the required engine power output with a high compression ratio. Additionally, a high compression ratio can cause the pressure within the combustion chamber to drop quickly, in some cases before a connecting rod connecting a piston crown to a crankshaft reaches an angle sufficient to generate maximum torque on the crankshaft. A lower compression ratio can maintain the combustion chamber pressure at a higher level for a longer time, thereby improving torque, but can waste energy out the exhaust valve or valves because the hot combustion gases may not have fully expanded before being exhausted.

For a typical driving cycle of a motor vehicle, the majority of fuel consumption generally occurs during low load and idling operation of the vehicle's internal combustion engine. Low load operating conditions can include cruising at a constant or near constant speed, decelerating, driving downhill, gentle acceleration, or the like. However, under certain conditions, such as for example rapid acceleration, hauling or towing of heavy vehicle loads or many passengers, driving uphill, or the like, the vehicle engine must be capable of providing increased power in order to satisfy operator expectations. A conventional diesel engine generally provides efficiency and power output responses that are not well matched to typical vehicle use patterns.

One approach to improving the suitability of diesel engines for light duty vehicle applications has been the incorporation of turbocharging. In conventional turbocharged diesel engines, improvements in efficiency can be achieved by increasing the level of boost while also increasing a level of dilution of the air-fuel mixture. The increased boost provides a sufficient air temperature and density to support diesel ignition while dilution of the combustion mixture can assist in reducing combustion chamber temperatures by reducing the amount of energy released in each cycle. Decreased combustion chamber temperatures can be desirable in reducing generation of oxides of nitrogen (e.g., nitric oxide, NO, and nitrogen dioxide, $NO_2$, collective referred to as $NO_X$), which are common combustion-generated pollutants and a primary ingredient in tropospheric air pollution (e.g. "smog").

As a result of the increase in boost, a typical turbocharged diesel engine for light duty applications can experience a peak pressure of 150 bar or even more. Significant and heavy engine structural components are generally required to contain such pressures. These features add to the weight and the cost of diesel engines. Additionally, while diesel engines in general and turbocharged diesel engines in particular can improve upon levels of efficiency and performance achievable by conventional spark-ignited engines, control of air pollutants generated by such engines can be a significant challenge. For example, even using the approaches discussed above, production of $NO_X$ is often significantly increased in such engines because of the high temperatures inherent in diesel combustion, which can be further exacerbated by the use of high compression ratios and turbocharging.

The temperature of the fluids in a cylinder at the end of the compression stroke is generally a function of the starting temperature of the fluids upon being delivered to the cylinder, the amount of compression these fluids undergo during the compression stoke of the piston (e.g. the compression ratio), and the heat loss to the walls. At low engine speeds and engine loads, the fluid (e.g. air) entering the cylinder is essentially at ambient temperature because the turbocharger supplies very little boost at low speeds. Accordingly, for a cold start of the engine, an elevated compression ratio can be necessary to heat the fluid in the combustion chamber sufficiently to cause ignition of the injected fuel. After the engine has warmed up and the cylinder walls no longer act as a significant heat sink for the heat in the combustion chamber, a lower compression ratio can provide a sufficient fluid temperature at the end of the compression stroke to cause ignition.

Additionally, once the turbocharger begins supplying at least moderate levels of boost, air passing through the turbocharger is heated both by the compression occurring within the turbocharger and due to inefficiencies of the turbocharger. Because this air passing through the turbocharger is at an elevated temperature, its density is lower than would be achievable if the air were cooled back down to ambient temperature (e.g. the temperature of the air entering the turbocharger) at the elevated turbocharger outlet pressure. An intercooler or other heat exchanger mechanism is typically used in conjunction with a turbocharger to remove at least some of the heat added to the inlet air by the turbocharger. However, an intercooler typically does not cool the compressed inlet air all the way back to the ambient temperature. While the engine is up and running (i.e. not cool as at start-up), the cylinder walls are generally fully warmed up. Addition of the extra heat load provided by the compressed inlet air can readily cause the combustion chamber temperature to significantly exceed the temperature necessary to sustain adequate combustion. The heat balance in the combustion chamber can therefore be biased toward increasing combustion temperature as the engine continues to operate. As such, starting from an elevated air inlet temperature, undergoing a compression in the combustion chamber on the compression stroke, and then burning a substantial amount of fuel to provide power for a moderate to heavy engine load can readily lead to highly elevated temperatures within the combustion chamber, which can lead to elevated production of $NO_X$.

Currently available approaches to pollutant emissions control in diesel engines generally include conversion of combustion-generated $NO_X$ to non-polluting compounds. One or more after-treatment systems are generally included, such as for example a system for injection of a "diesel exhaust fluid" containing urea or the like to react with $NO_X$ in the presence of a selective reduction catalyst to produce nitrogen gas ($N_2$) and water vapor ($H_2O$). Examples of such systems are featured in "Advanced Diesel" vehicles available from Bayerische Motoren Werke AG (Munich, Bavaria, Germany), Turbocharged Direct Injection (TDI™) vehicles available from Volkswagen (Wolfsburg, Lower Saxony, Germany), and Mercedes BlueTech™ vehicles available from Daimler AG (Stuttgart, Baden-Württemberg, Germany). These after-treatment systems can be complicated and expensive.

A diesel engine consistent with one or more implementations of the current subject matter can feature a variable compression ratio capability in which a high compression ratio is used for light load, high efficiency operation and a lower compression ratio is used in combination with turbocharging to provide higher power. The lower compression ratio, higher power operating mode can typically include reduced fuel efficiency performance.

Figure 1:
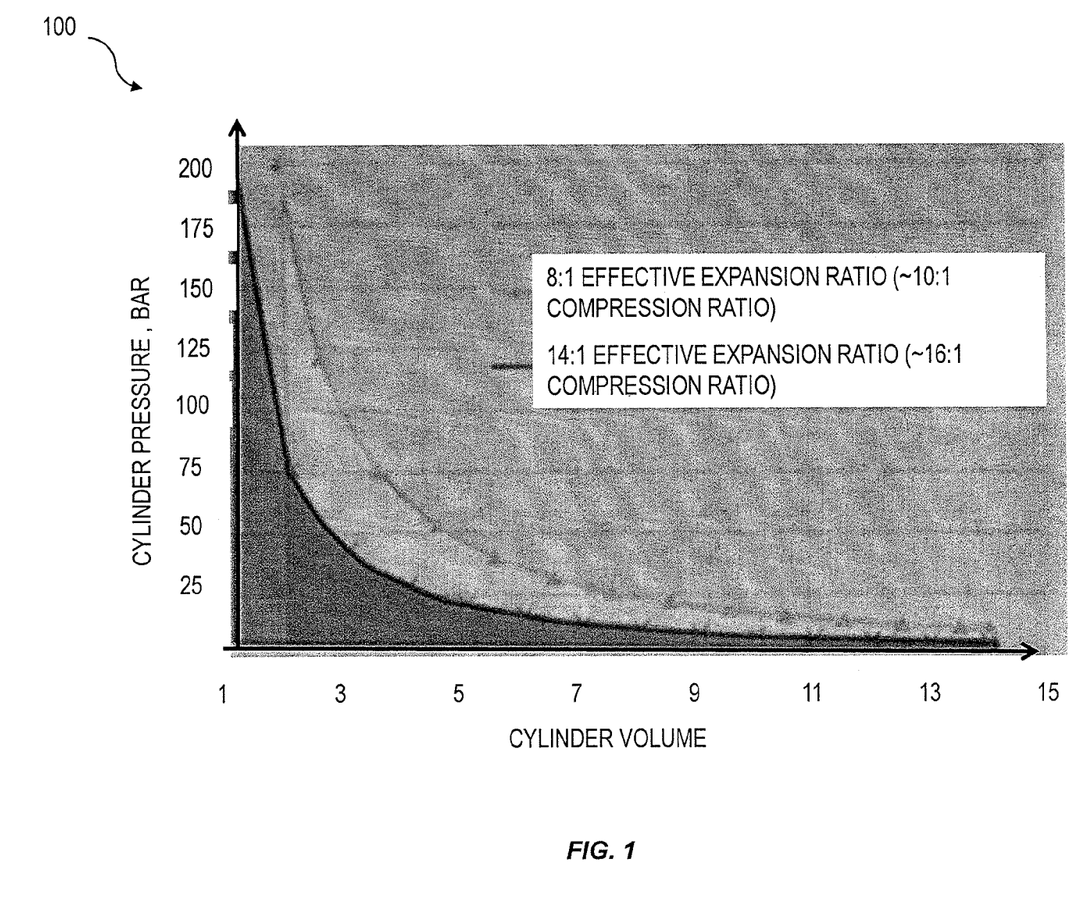
FIG. 1 shows a chart comparing two examples of effective expansion ratio and compression ratio combinations.

FIG. 1 shows a chart 100 illustrating two curves of cylinder pressure vs. cylinder volume for two different modes of engine operation. The data in FIG. 1 show examples in which variable compression ratio in a diesel can provide equal peak pressure, but 45% more power at the lower compression ratio. A lower compression ratio can be used for high power, and a higher compression ratio can be used for starting and for most operation (e.g. during a lower power, high efficiency part of the drive cycle). In a first mode, a high compression ratio (in this example, approximately 16:1) can be provided in conjunction with an effective expansion ratio of 14:1 for higher efficiency operation at lighter loads.

To extract greater power in response to larger engine loads, a second mode can feature a lower compression ratio (in this example, approximately 10:1) provided in conjunction with an effective expansion ration of 8:1. It should be understood that the data in FIG. 1 are provided for illustrative purposes of two potential compression ratio regimes. A diesel engine consistent with implementations of the current subject matter can include a continuum of compression ratios between a lowest compression ratio for highest power and a highest compression ratio for higher efficiency. Alternatively, a finite set of compression ratio options can be provided.

In some implementations of the current subject matter, an opposed piston engine configuration can be used in a diesel engine featuring variable compression ratio and four-stroke operation. Non-limiting examples of opposed piston engine configurations and other engine features that can be used in association with one or more implementations of the current subject matter include the following co-owned U.S. patents and patent application publications: U.S. Pat. No. 7,559,298 ("Internal Combustion Engine"), U.S. Pat. No. 8,413,619 ("Variable Compression Ratio System for Opposed-Piston and Other Internal Combustion Engines, and Related Methods of Manufacture and Use"), US2010/0212622A1 ("Sleeve Valve Assembly"), US2011/0041799A1 ("High Swirl Engine"), and US2012/0158273A1 ("Multi-Mode High Efficiency Internal Combustion Engine")."

Figure 2A:
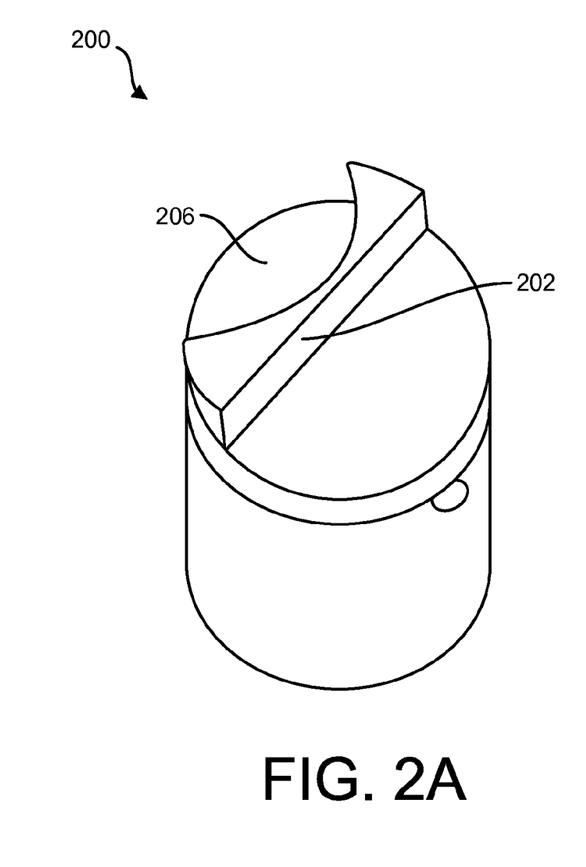
FIG. 2A and FIG. 2B shows a diagram showing elevation views of designs for two opposed piston crowns.
Figure 2B:
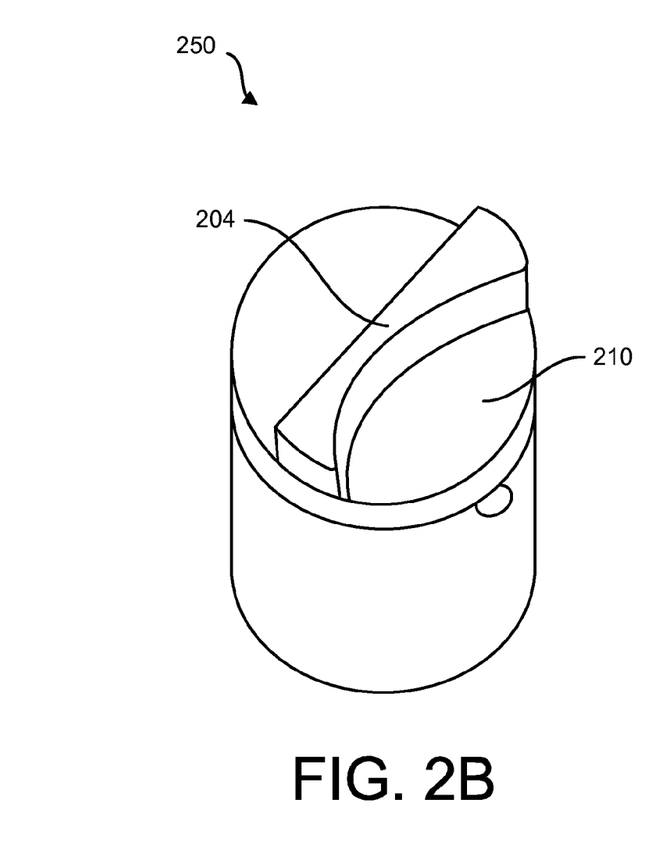

In some implementations of the current subject matter, an opposed piston engine such as those referenced above can include piston crowns similar to those shown in the diagrams 200, 250 of FIG. 2A and FIG. 2B. These piston crowns, which are configured to be oriented on two opposed pistons such that the raised protrusions 202, 204 overlap each other at the closest approach of the piston crowns 200, 250, can form two pockets 206, 210 within the combustion chamber. When used in combination with a swirl inducing inlet port (e.g. as described in one or more of the documents cited above, can cause the swirling inlet air entering as a single flow field to divide into two co-rotating swirls as the pistons come together near top dead center.

Figure 3A:
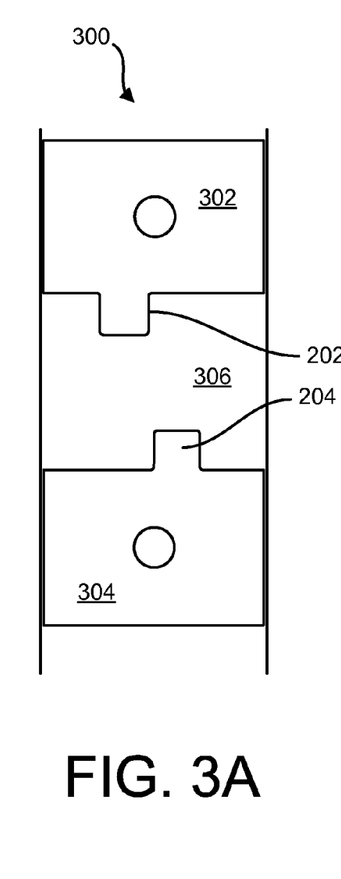
FIG. 3A, FIG. 3B and FIG. 3C shows a diagram showing a cross-sectional view of the two opposed piston crowns at three different positions in a cylinder of an internal combustion engine.
Figure 3B:
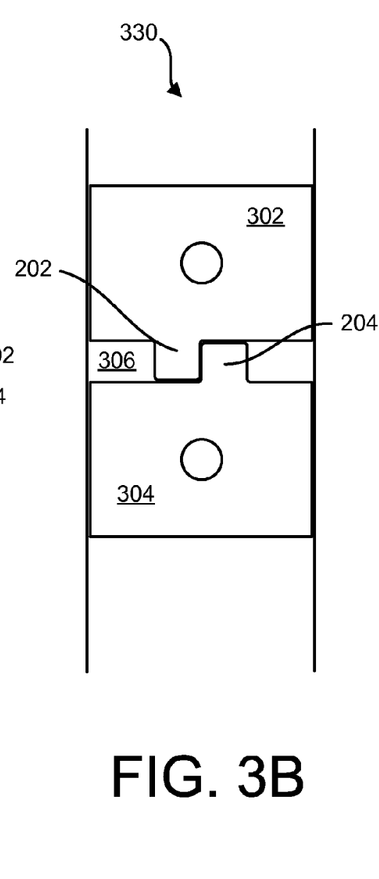
Figure 3C:
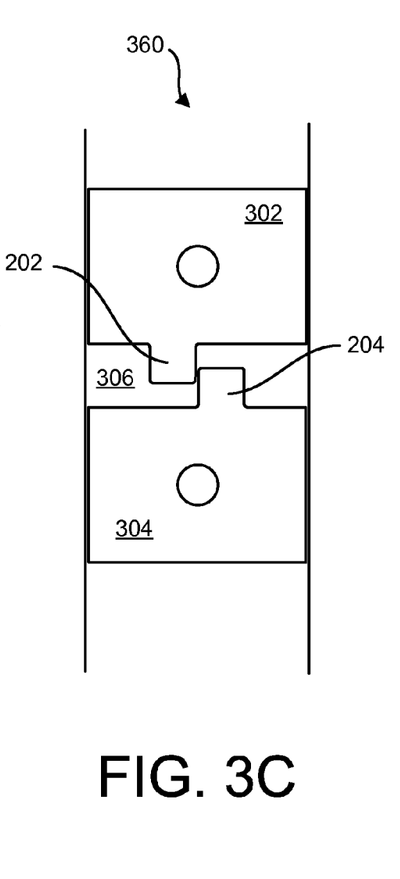

This splitting can be due to the overlapping crown shape features on the pistons, for example as further illustrated in reference to the cross-sectional diagrams 300, 330, and 360 of FIG. 3A, FIG. 3B, and FIG. 3C. The structure of the raised protrusions 202, 204 projecting up from the surface of each of the opposed piston crowns can optionally have a shape that resembles half of an hourglass. The two opposed pistons can each have such a "pop-up" shape on opposite sides of the piston crown such that when the piston crowns are nearest to one another (e.g. at top dead center position) the raised protrusions 202, 204 overlap as shown in FIG. 3A, FIG. 3B, and FIG. 3C.

In FIG. 3A, the two opposed pistons 302, 304 whose crowns include the raised protrusions 202, 204, respectively, are approaching to compress a combustion chamber 306 between them. FIG. 3B and FIG. 3C show overlap of these piston crown projections at top dead center for a maximum compression ratio condition (FIG. 3B) and a minimum compression ratio condition (FIG. 3C). As shown in these diagrams, as the compression ratio changes, the amount of overlap of the raised protrusions 202, 204 changes. Even at the minimum compression ratio condition, the raised protrusions 202, 204 still overlap and divide the inlet flow into two co-rotating swirls as noted above. In this manner, the co-rotating swirls can effectively cancel the swirl induced by the high swirl port. Accordingly, the raised protrusions can be referred to as swirl canceling features on piston crowns.

As the pistons come apart, the two co-rotating swirl flows can experience high shear with each other at the center of the chamber, which can change the macro motion of the swirls to micro motion of eddy turbulence. This feature can complete the mixing of air and injected fuel. The micro motion damps out quickly and can thereby decrease heat transfer to the walls of the combustion chamber as the pistons expose more cylinder wall area to the hot combustion gases.

In some implementations of the current subject matter, a first of the co-rotating swirls can be formed in front of a first fuel injector within the combustion chamber and a second of the co-rotating swirls can be formed in front of a second fuel injector within the combustion chamber.

Consistent with some implementations of the current subject matter, variable compression ratio can be combined with turbocharging, or supercharging. At high boost, the air temperature in the inlet air ducting can be significantly higher than ambient. Initiating compression on this high temperature air can ensure that even at low compression ratios, the temperature of the air after compression is high enough to ensure stable combustion, thereby supporting consistent combustion at high power.

High compression ratios can be used when the engine inlet air temperature is low, either from a cold start or when operating at low boost. Use of high compression ratio under such conditions can support stable combustion, even with relatively low inlet air temperature and/or light power. In some implementations of the current subject matter, variable compression ratio can be achieved using crank phase changing on opposed pistons such as for example as described in U.S. Pat. No. 8,413,619 (referenced above). This approach can be advantageous due to the reduced torque magnitude needed to be carried between the two crankshafts at low compression/high output torque situations.

It should be noted that the significantly higher torque (e.g. resulting from increased combustion chamber pressure) shown in FIG. 1 can require a mass flow increase that is at least slightly higher than the resulting torque increase because the efficiency is generally lower with the lower expansion ratio used for high engine load conditions.

High energy left in exhaust from low expansion ratio operation of the engine can be available for use in turbocharging. This feature can provide some of the higher level of work that can be required to provide a higher mass flow up to higher inlet manifold pressures. Consistent with some implementations of the current subject matter, excess heat in exhaust gases from the engine can require cooling before entry into the turbocharger to avoid an over temperature condition that can be harmful to one or more turbine components within the turbocharger.

Both inlet gases (e.g. air that has been compressed by a turbocharger) and exhaust gases can optionally be ducted through intercoolers or not ducted through intercoolers depending on the temperature of the respective gas stream. Consistent with operating requirements for a diesel engine, the inlet gas temperature generally should be sufficiently high to cause ignition, but as low as possible to provide maximum power density (e.g. by allowing the densest charge of air possible into the combustion chamber). The exhaust gases can be ducted through a cooler, if necessary, before the turbine of a turbocharger as noted above. As such, the intercooler can be modulated to ensure that the charge density can be high, but not so cool that the combustion is compromised.

Figure 4:
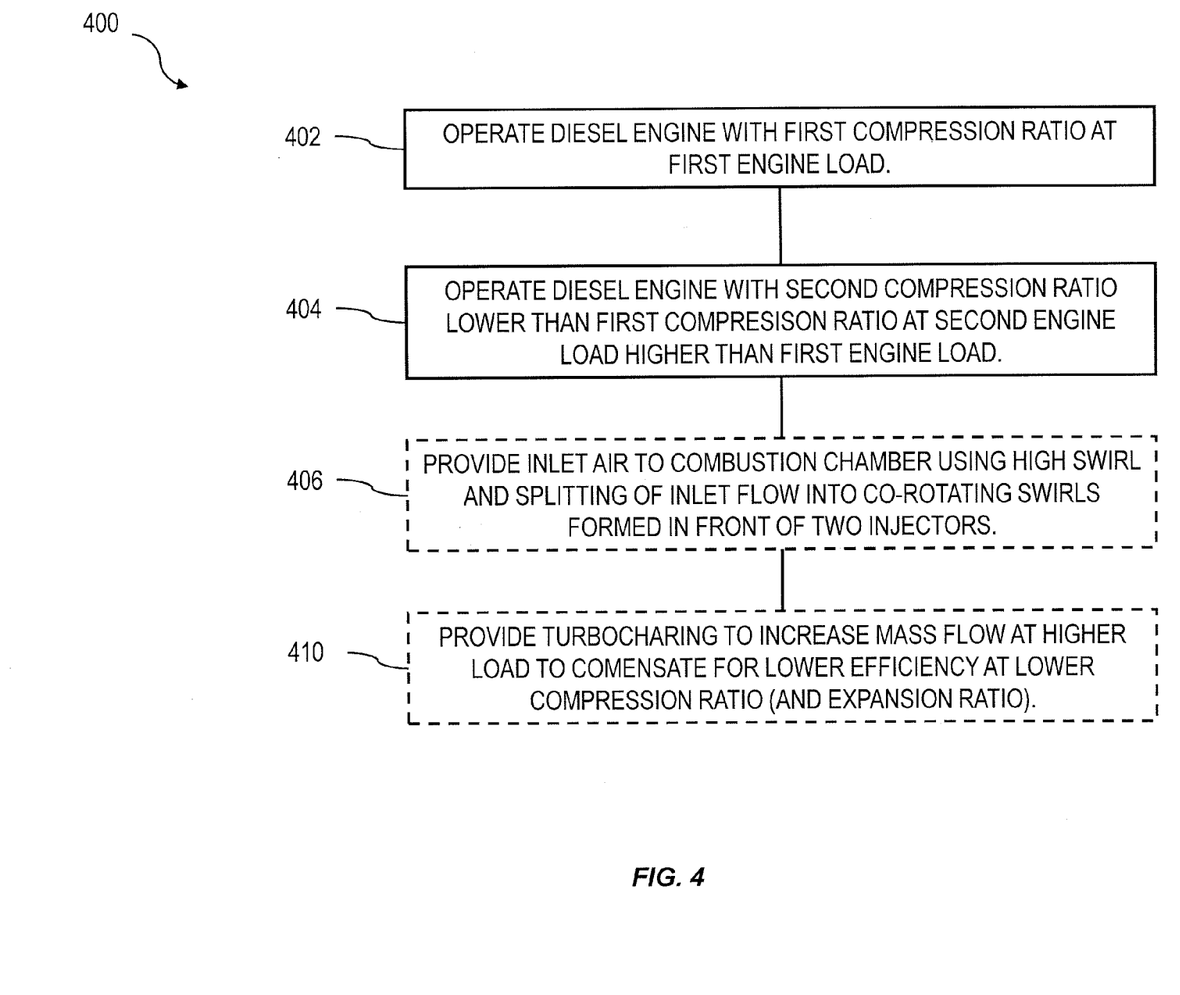
FIG. 4 shows a process flow diagram illustrating aspects of a method having one or more features consistent with implementations of the current subject matter.

FIG. 4 shows a process flow chart 400 illustrating features that can be present in one or more implementations of the current subject matter. A 402, a diesel engine can be operated with a first compression ratio at a first engine load. At a second, higher engine load than the first engine load, the engine can be operated at 404 with a second compression ratio that is smaller than the first compression ratio. In some implementations of the current subject matter, the engine can be an opposed piston engine, and can optionally include a turbocharger for increasing a level of boost. In other words, air is supplied to the combustion chamber via a turbocharger that increases a pressure of the supplied air to higher than ambient pressure. The opposed piston engine can optionally have the opposed pistons reciprocating along a common axis (e.g. an "inline" opposed piston engine) or reciprocating along two axes that are not collinear (e.g. a "bent" opposed piston engine).

At 406, a swirl inducing feature, for example as discussed above in reference to FIG. 2A, FIG. 2B, FIG. 3A, FIG. 3B, and FIG. 3C can optionally be provided to cause inlet air to the combustion chamber to have a high swirl and to split into at least two co-rotating swirls formed in front of respective injectors that deliver fuel to the combustion chamber. At 410, turbocharging or supercharging can optionally be provided to increase mass flow of inlet air to the combustion chamber, in particular at high engine loads, to offset or otherwise compensate for lower efficiency experienced at lower compression and expansion ratios. In other words, the turbocharger supplies inlet air with a second pressure while the second compression ratio is used and a first pressure while the first compression ratio is used, the second pressure being larger than the first pressure A drive-cycle compatible diesel engine capable of operation in a manner that reduces or even eliminates substantial production of $NO_X$ is desirable given the cost and complexity of emissions controls systems typically required with current diesel technology. In some implementations of the current subject matter, a turbocharged diesel engine can include an engine controller that regulates one or more engine operation conditions to control temperatures within the combustion chamber so that $NO_X$ production is limited to a predetermined level.

For example, the temperature of the inlet air at the intercooler outlet of a turbocharged diesel engine can be used as at least one parameter in a determination of the compression ratio necessary for adequate ignition and combustion of the fuel in the combustion chamber. In this manner, lower combustion temperatures are maintained for minimum $NO_X$ generation. Reducing the combustion gas temperature results in decreased $NO_X$ formation.

Using a variable compression ratio feature in conjunction with a turbocharged diesel engine can allow dynamic alteration of the compression ratio in order to control the combustion chamber temperature achieved at the end of the compression stroke such that a lower limit combustion chamber temperature necessary to support combustion of the injected fuel is maintained while an upper limit combustion chamber temperature necessary to keep $NO_X$ production below a target threshold is not exceeded. For lighter engines, such as for example passenger vehicle applications, a reduced compression ratio can allow improved power density because of the larger amount of expansion work available to exert torque on the vehicle crankshaft.

Operation at the reduced compression ratio of the second mode as discussed above is less fuel efficient than operation at a higher compression ratio (e.g. as in the first mode discussed above). However, if the engine requires an elevated power output only for a limited and intermittent part of its operation cycle (e.g. in a typical passenger or light duty truck drive cycle), the temporarily reduced efficiency necessary to supply increased power output during such periods does not significantly impact the overall efficiency of the vehicle. By making the engine capable of achieving higher power density on demand via the lower compression ratio second mode discussed, a smaller (e.g. lighter, cheaper, etc.) engine can be provided to supply the same peak power as a heavier engine running at a constant, elevated compression ratio. The downsized engine can be operated at a more efficient part of the operating curve for most of its operational life, thereby saving significant amounts of fuel.

Figure 5:
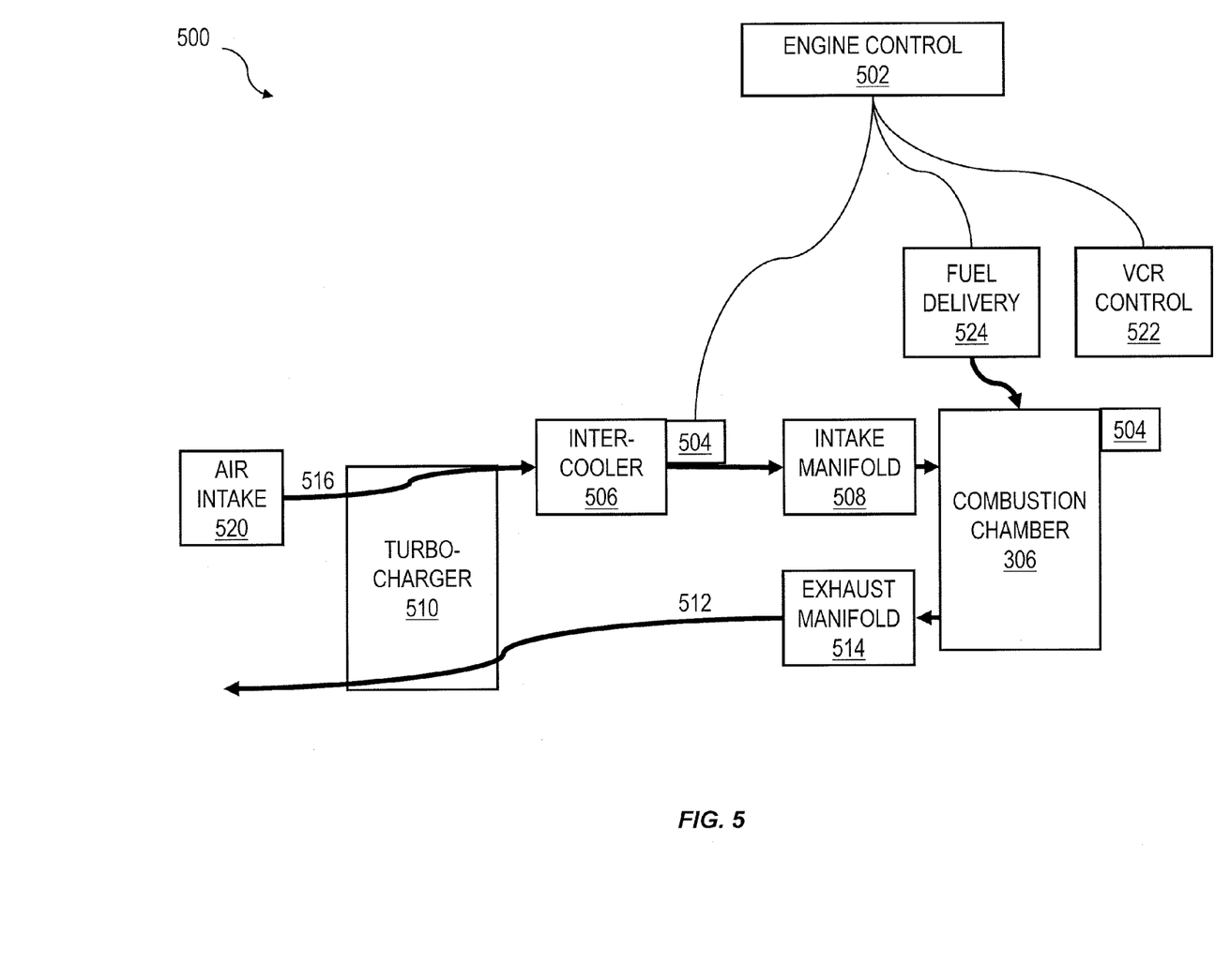
FIG. 5 shows a diagram illustrating aspects of an engine system consistent with implementations of the current subject matter.

In one example illustrated in the diagram of an engine system 500 of FIG. 5, an engine controller (e.g. an engine control unit or ECU) 502 receives one or more units of information about engine operation. One type of information can originate from an intercooler outlet temperature sensor 504 measuring a temperature of air delivered by an intercooler 506 to a combustion chamber 306 via an intake manifold 508 and one or more intake valves (not shown). The intercooler 506 can cool air compressed by a turbocharger 510, which can be powered by exhaust gases 512 removed from the combustion chamber 306, for example by way of an exhaust manifold 514, and which can receive intake air 516 from an air intake 520. Another unit of information can include a current compression ratio within the combustion chamber 306. Such a signal, or alternatively simply information on the current compression ratio state of the combustion chamber 306, can be received from a variable compression ratio control system 522, which can optionally include one or more of electronic and mechanical controls that affect one or more of a combustion chamber geometry, a valve timing for affecting changes in an effective compression ratio of the combustion chamber, a piston phase timing control (e.g. for phaser-driven VCR in an opposed piston engine), etc. The engine control 502 can also receive information about one or more of a current level of boost being provided by the turbocharger 510, a current load on the engine, a current engine speed, a temperature representative of the combustion chamber temperature (e.g. a cylinder wall temperature, a piston crown temperature, etc.), an amount of fuel injected or to be injected into the combustion chamber for a given engine cycle, the timing of the injection or injections during a cycle of the engine, and the like. Information about fuel delivery amounts and timing can be received from a fuel delivery system 524. One or more engine load and speed sensors and/or temperature sensors (not shown) can be included to provide information to the engine control 502. The engine control 502 can optionally include one or more special purpose or general purpose programmable processors, which can execute control logic implemented in software, hardware, firmware, or some combination thereof.

Figure 6:
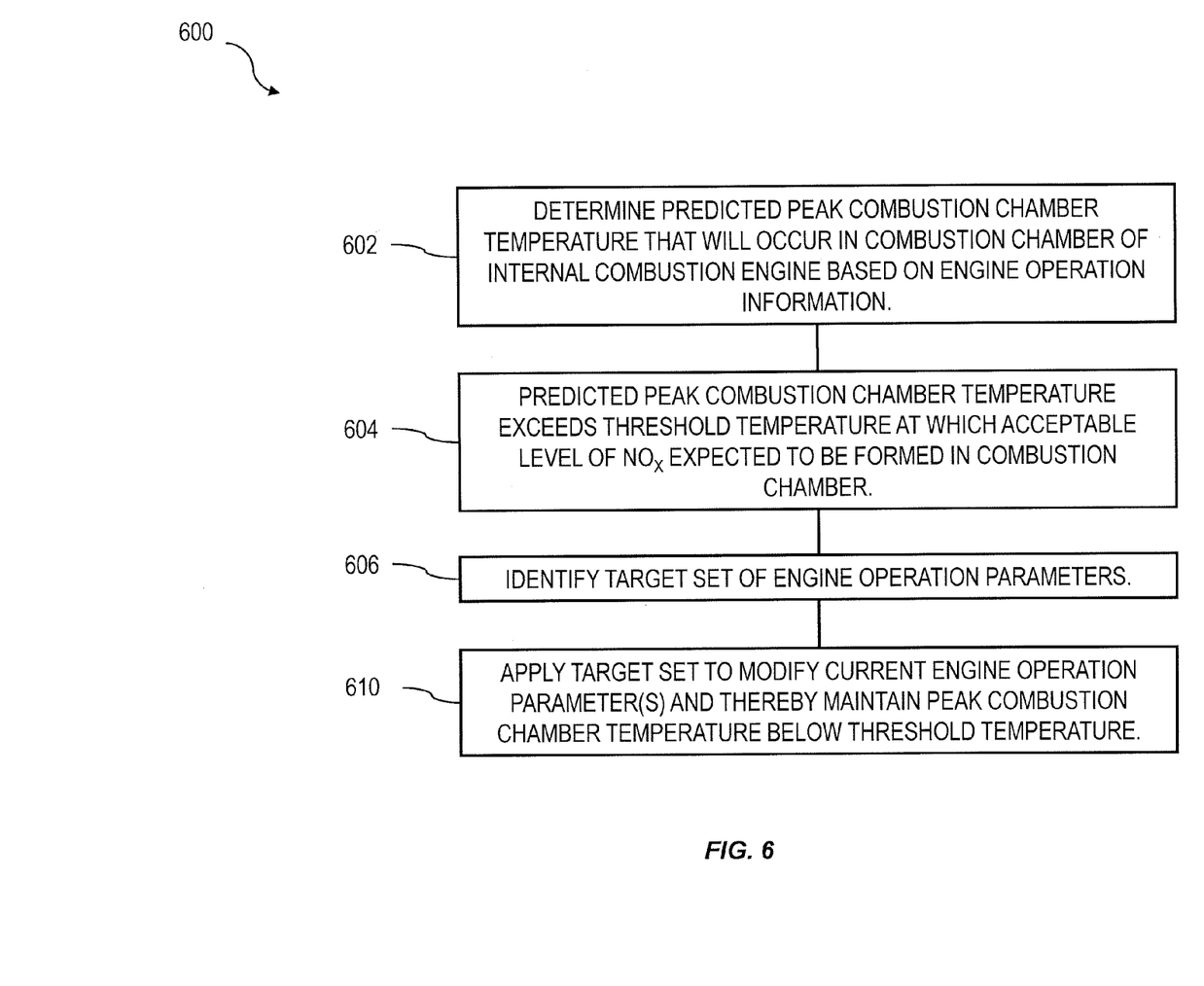
FIG. 6 shows a process flow diagram illustrating aspects of another method having one or more features consistent with implementations of the current subject matter.

Accordingly, consistent with one or more implementations of the current subject matter, methods are provided for operating a turbocharged diesel engine in a manner that reduces or otherwise curtails formation of $NO_X$ below some predetermined limit for at least some part of the operating cycle of the engine. FIG. 6 shows a flow chart illustrating features that can be present in such a method. It will be understood that one or more features of a method consistent with FIG. 6 can be used in conjunction with one or more features of a method consistent with FIG. 4 and visa versa. Referring again to FIG. 6, at 602 an engine controller determines, based on engine operation information, a predicted peak combustion chamber temperature that will occur in a combustion chamber of an internal combustion engine, which can be a diesel engine such as those discussed elsewhere herein (optionally an opposed piston diesel engine with turbocharging). When, at 604, the predicted peak combustion chamber temperature exceeds a threshold temperature at which an acceptable level of nitrogen oxide pollutants ($NO_X$) is expected to be formed in the combustion chamber, a target set of engine operation parameters are identified at 606. The target set of engine parameters are applied to modify one or more current engine operation parameters at 610 and thereby maintain the peak combustion chamber temperature below the threshold temperature.

In one example, the engine operation information can include an intercooler outlet temperature and a compression ratio within the combustion chamber of the engine. The target set of engine parameters can include fuel delivery parameters, such as for example an amount of fuel injected into the combustion chamber for a given engine cycle, a timing of one or more injections of fuel during a cycle of the engine, or the like. Delaying a timing of the injection of the fuel can delay ignition, which can have a similar effect to retarding spark timing in a spark-injected engine. If fuel ignition were to occur, for example, at several degrees past top dead center of the piston or pistons driven by the combustion chamber, a reduced peak temperature occurs because the volume of the cylinder is already expanding, limiting the rate of pressure rise and thereby the temperature rise. Accordingly, the energy density can be reduced, and less heat is generated in the combustion chamber. Multiple injections of fuel during the engine cycle can also slow the speed of the combustion event, which can have an effect of reducing temperature in the combustion chamber.

Additional variations of methods consistent with FIG. 6 can include the use of one or more of a level of boost from the turbocharger, a current load on the engine, a current engine speed, a temperature representative of the combustion chamber temperature, or the like as part of the engine operation information. The level of boost of the turbocharger can optionally be changed as part of the target set of engine parameters. In some examples, the compression ratio of the engine can be determined at least in part according to a required load on the engine and an engine speed, and the fuel delivery characteristics (timing, amount, number of injections, etc.) can be part of the target set of engine parameters that are identified at 606 and applied at 610 to limit the peak temperature in the combustion chamber. In other examples, the compression ratio can be part of the target set of engine parameters that are identified at 606 and applied at 610 to maintain the peak temperature in the combustion chamber below the threshold temperature and can therefore be determined and applied based on maintaining the peak combustion chamber temperature below the threshold temperature. In other words, a current compression ratio can be changed to a smaller compression ratio to reduce an energy density within the combustion chamber and thereby reduce the peak temperature.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claim may include other implementations or embodiments.

What is claimed is:

1. A method comprising:
    operating a diesel opposed piston engine with a first compression ratio to supply engine power in response to a first engine load, the diesel opposed piston engine comprising a combustion chamber defined at least in part by respective crowns of two pistons each having one or more swirl canceling features and each individually coupled to one of two crankshafts, the swirl canceling features forming two pockets within the combustion chamber as the two pistons come together near a top dead center position to thereby cause inlet air delivered from an inlet port to the combustion chamber as a single flow field to be divided into separate co-rotating swirls within the two pockets, the two co-rotating swirls experiencing high shear with each other at a center of the combustion chamber as the two pistons move apart from the top dead center position; and
    changing the first compression ratio to a second compression ratio to supply engine power in response to a second engine load, the second engine load being larger than the first engine load, the second compression ratio being smaller than the first compression ratio.

2. A method as in claim 1, wherein the changing of the compression ratio is performed using at least one of a phasing change of the phase of the two pistons and a translation of a distance between the two crankshafts.

3. A method as in claim 1, wherein inlet air is supplied to the combustion chamber via a turbocharger that increases a pressure of the supplied air to higher than ambient pressure.

4. A method as in claim 3, wherein the turbocharger supplies inlet air with a second pressure while the second compression ratio is used and a first pressure while the first compression ratio is used, the second pressure being larger than the first pressure.

5. A method as in claim 1, wherein the two co-rotating swirls are formed in front of respective injectors that deliver fuel to the combustion chamber.

6. A method as in claim 1, further comprising:
    determining, based on engine operation information, a predicted peak combustion chamber temperature that will occur in the combustion chamber;
    identifying a target set of engine operation parameters when the predicted peak combustion chamber temperature exceeds a threshold temperature at which an acceptable level of nitrogen oxide pollutants ($NO_X$) is expected to be formed in the combustion chamber; and
    applying the target set of engine operation parameters to modify one or more current engine parameters to thereby maintain the peak combustion chamber temperature below the threshold temperature.

7. A method as in claim 6, wherein the engine operation information comprises an intercooler outlet temperature measured at or near an outlet of an intercooler that receives and cools air compressed by a turbocharger, and a compression ratio within the engine.

8. A method as in any of claim 6, wherein the target set of engine parameters comprises fuel delivery parameters.

9. A method as in claim 6, wherein the fuel delivery parameters comprise one or more of an amount of fuel injected into the combustion chamber for a given engine cycle, a timing of one or more injections of fuel during a cycle of the engine, and a number of injections of fuel occurring during the cycle of the engine.

10. A method as in claim 6, wherein the target set of engine parameters comprises a change of a current compression ratio to a smaller compression ratio to reduce an energy density within the combustion chamber and thereby reduce the peak temperature.

11. A method as in claim 1, wherein the swirl canceling features comprise raised protrusions on the respective piston crowns, and wherein the raised protrusions overlap at the top dead center position of the two pistons such that the raised protrusions divide the singe flow field of the inlet air to the combustion chamber into the two co-rotating swirls.

12. A diesel opposed piston engine comprising:
    two opposed pistons each having one or more swirl canceling features on their respective crown and each individually coupled to one of two crankshafts,
    an inlet port configured to deliver inlet air as a single flow field to a combustion chamber defined at least in part by the crowns of the two opposed pistons, wherein the swirl canceling features form two pockets within the combustion chamber as the two pistons come together near a top dead center position to thereby cause the inlet air to be divided into separate co-rotating swirls within the two pockets, the two co-rotating swirls experiencing high shear with each other at a center of the combustion chamber as the two pistons move apart from the top dead center position; and an engine controller, the engine controller performing operations comprising:
operating the diesel opposed piston engine with a first compression ratio to supply engine power in response to a first engine load; and
changing the first compression ratio to a second compression ratio to supply engine power in response to a second engine load, the second engine load being larger than the first engine load, the second compression ratio being smaller than the first compression ratio.

13. A diesel opposed piston engine as in claim 12, further comprising a compression ratio changing mechanism, the compression ratio changing mechanism comprising at least one of a phaser for changing a phase of the two pistons and a translation mechanism for changing a distance between the two crankshafts.

14. A diesel opposed piston engine as in claim 12, further comprising a turbocharger that increases a pressure of inlet air supplied to the combustion chamber, the turbocharger supplying inlet air with a second pressure while the second compression ratio is used and a first pressure while the first compression ratio is used, the second pressure being larger than the first pressure.

15. A diesel opposed piston engine as in claim 12, wherein the at least two co-rotating swirls are formed in front of respective injectors that deliver fuel to the combustion chamber.

16. A diesel opposed piston engine as in claim 12, wherein the operations performed by the engine controller further comprise:
determining, based on engine operation information, a predicted peak combustion chamber temperature that will occur in the combustion chamber;
identifying a target set of engine operation parameters when the predicted peak combustion chamber temperature exceeds a threshold temperature at which an acceptable level of nitrogen oxide pollutants ($NO_x$) is expected to be formed in the combustion chamber; and
applying the target set of engine operation parameters to modify one or more current engine parameters to thereby maintain the peak combustion chamber temperature below the threshold temperature.

17. A diesel opposed piston engine comprising:
a combustion chamber defined at least in part by crowns of two pistons each having one or more swirl canceling features coupled to two crankshafts; and
an engine controller, the engine controller performing operations comprising:
determining, based on engine operation information, a predicted peak combustion chamber temperature that will occur in the combustion chamber;
identifying a target set of engine operation parameters when the predicted peak combustion chamber temperature exceeds a threshold temperature at which an acceptable level of nitrogen oxide pollutants ($NO_x$) is expected to be formed in the combustion chamber; and
applying the target set of engine operation parameters to modify one or more current engine parameters to thereby maintain the peak combustion chamber temperature below the threshold temperature.

18. A diesel opposed piston engine as in claim 17, wherein:
the engine operation information comprises an intercooler outlet temperature measured at or near an outlet of an intercooler that receives and cools air compressed by a turbocharger, and a compression ratio within the engine; and
the target set of engine parameters comprises at least one of fuel delivery parameters, a change of a current compression ratio to a smaller compression ratio to reduce an energy density within the combustion chamber and thereby reduce the peak temperature.

19. A diesel opposed piston engine as in claim 17, wherein the fuel delivery parameters comprise one or more of an amount of fuel injected into the combustion chamber for a given engine cycle, a timing of one or more injections of fuel during a cycle of the engine, and a number of injections of fuel occurring during the cycle of the engine.

20. A diesel opposed piston engine as in claim 12, wherein the swirl canceling features comprise raised protrusions on the respective piston crowns, and wherein the raised protrusions overlap at the top dead center position of the two opposed pistons such that the raised protrusions divide the singe flow field of the inlet air to the combustion chamber into the two co-rotating swirls.

* * * * *